June 15, 1943. C. W. SHIPPEE 2,321,630
COMBINED POWER SHOVEL AND TRUCK
Filed Feb. 9, 1942 3 Sheets-Sheet 3
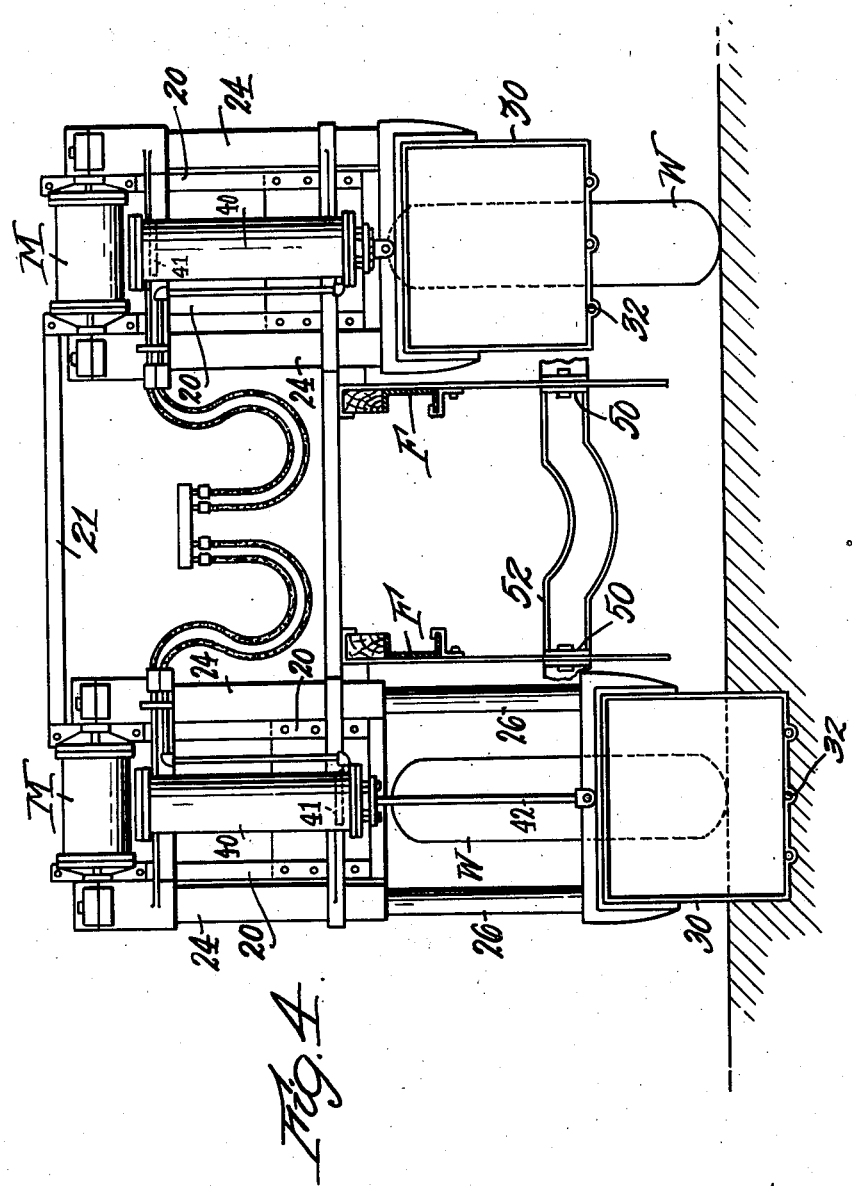

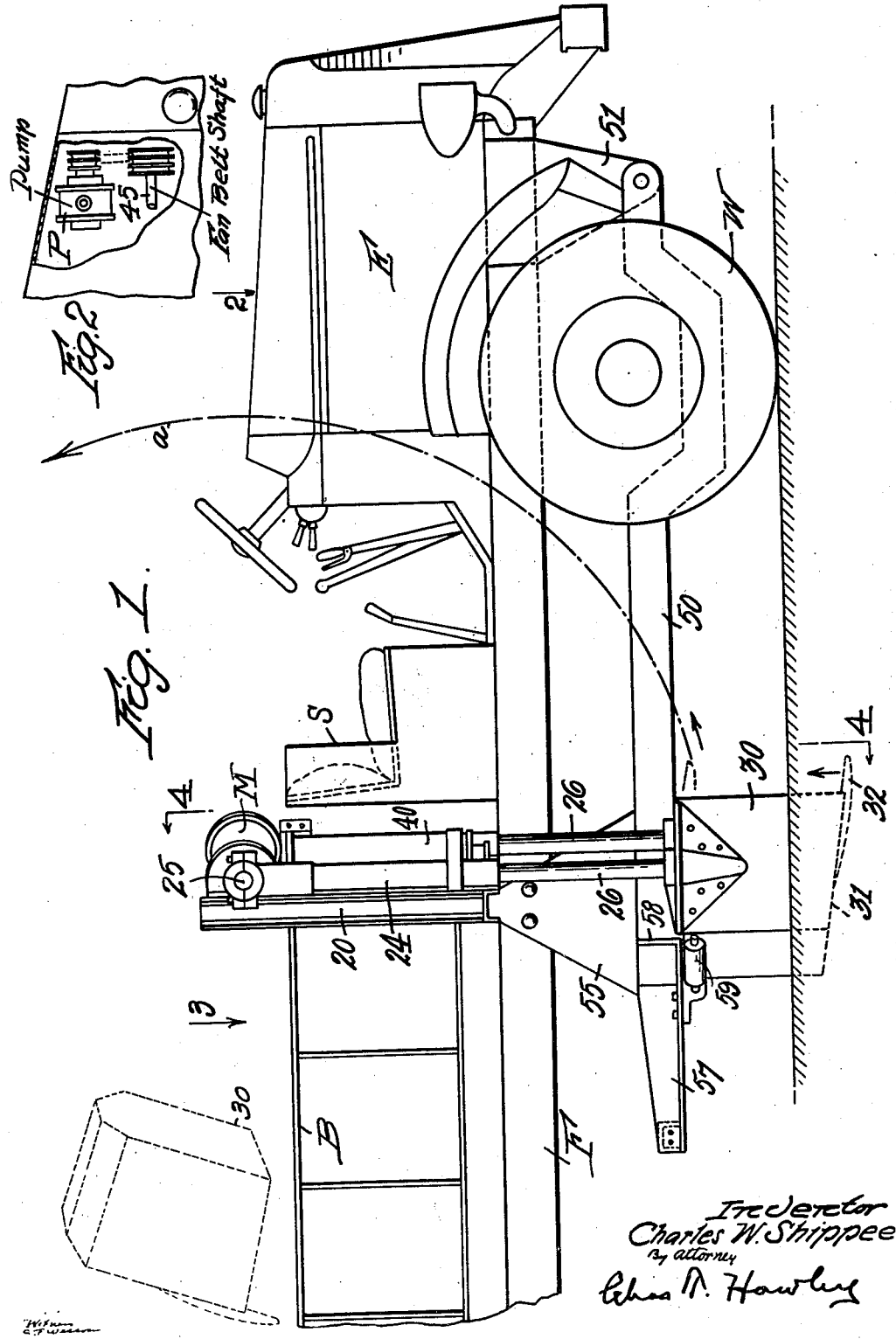

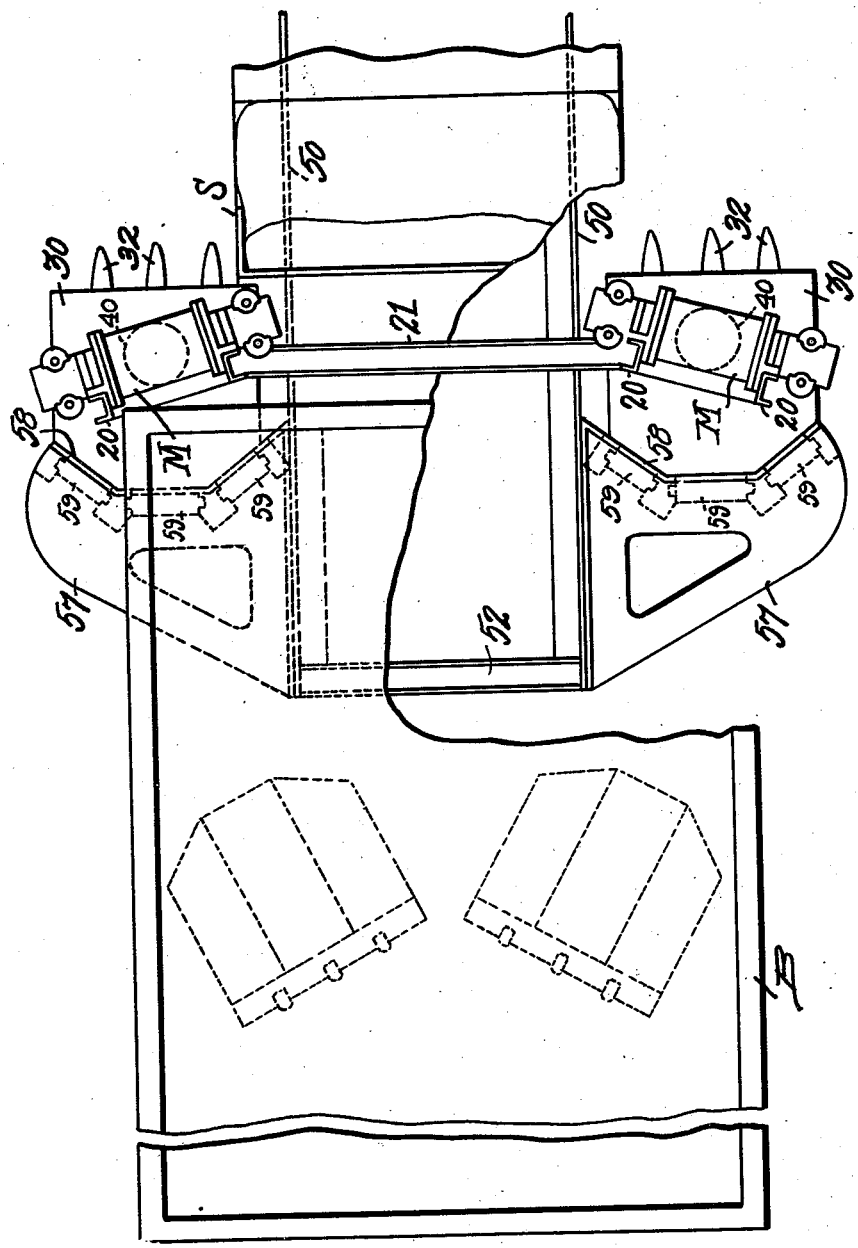

Patented June 15, 1943

2,321,630

UNITED STATES PATENT OFFICE 2,321,630

COMBINED POWER SHOVEL AND TRUCK

Charles W. Shippee, Worcester, Mass.

Application February 9, 1942, Serial No. 430,063

5 Claims. (Cl. 214—78)

This invention relates to a combined power shovel and truck, especially adapted for surface excavation and for grading operations.

It is the general object of my invention to provide improved apparatus for such purposes, so designed that the tractive power of the truck itself may be directly utilized in filling the buckets.

A further object is to provide a combined power shovel and truck, so designed that the buckets are spaced apart laterally when in filling position but move inward or toward each other as they approach inverted dumping positions over the truck body.

I also provide means by which the radius of swinging motion of the buckets may be varied during the dumping operation, and by which the buckets may be held at different elevations while being filled.

My invention further relates to arrangements and combinations of parts which will be hereinafter described and more particularly pointed out in the appended claims.

A preferred form of the invention is shown in the drawings, in which

Fig. 1 is a side elevation of my combined power shovel and truck, with the rear portion of the truck omitted;

Fig. 2 is a fragmentary plan view, partly in section, and looking in the direction of arrow 2 in Fig. 1;

Fig. 3 is a partial plan view of my improved shovel and truck, with parts of the truck body broken away; and Fig. 4 is a front elevation of my combined shovel and truck.

Referring to the drawings, my combined apparatus comprises a truck frame F supporting a body B, preferably arranged for dumping, and said frame is provided with wheels W, the front wheels only being shown. In front of the body B, there is provided an operator's seat S and an engine designated generally at E. All of these parts may be of the usual commercial construction.

Between the body B and the seat S, I provide a rigid upright frame-work 20 at each side of the truck, the frames 20 being connected at their upper ends by a tie bar 21 (Fig. 4). A powerful rotary hydraulic motor M is mounted at the upper end of each frame-work 20, and hollow cylindrical arms 24 are fixed to the ends of the main shaft 25 of each motor M.

Plungers 26 are slidable in the cylindrical arms 24 and at their lower ends are firmly secured to buckets 30, which are preferably open only at their front faces. The bottom 31 of each bucket is preferably inclined downwardly and forwardly when in working position, and may be provided with a plurality of breaking teeth 32.

A hydraulic cylinder 40 is mounted on each pair of arms 20 and is provided with a piston 41 connected by a rod 42 to the associated bucket 30. Liquid under pressure for the hydraulic motors M and for the cylinders 40 may be supplied by a rotary pump P (Fig. 2), which may be belt-driven from the fan belt shaft 45 or in any other convenient manner. The motors M are effective to swing the buckets in vertical planes from the working position shown in full lines in Fig. 1 to the dotted line dumping position also shown in said figure.

It will be seen from Fig. 3 that the axes of the motors M are angularly disposed with respect to the cross bar 21. Consequently, the buckets 30 do not move in planes parallel to the truck frame or to each other, but move in angularly disposed planes, so that the buckets approach the longitudinal center line of the truck as they are swung upward and rearward. The dumping relation of the buckets is clearly indicated in dotted lines in Fig. 3.

This angular position of the motors is very important, as it permits the buckets to operate at the sides of the truck frame and to be swung freely upward, while at the same time the dumping positions of the buckets are within the sides of the body B.

In order to apply the tractive force of the truck to the buckets 30, I provide a draft frame comprising side bars 50 (Fig. 1) secured at their front ends to brackets 51 fixed on the truck frame F. At their rear ends, the side bars are connected by a rigid cross frame member 52 (Fig. 4) and have supporting plates 55.

Each side bar 50 is provided at its rear end with a strong and rigid bracket 57, projecting outwardly and provided with an angular upstanding flange 58 at its front edge. Rollers 59 are mounted below each bracket 50 and are disposed at angles similar to those of the several faces of the flange 58. The front portions of the rolls should project slightly in advance of the associated faces of the flanges 58. The back portion of each bucket 30 has angularly disposed wall sections corresponding to the angles of the flanges 58 and rolls 59 and adapted to be engaged by said rolls.

When the truck is moving forward with a bucket lowered as shown in Fig. 1, the resistance of the material to be excavated presses the bucket rearward against the rolls 59. The buckets are then in direct communication with the truck frame F through the brackets 57 and side bars 56, so that the buckets are moved forward by the whole tractive force of the truck.

Having described the details of construction of my improved power shovel and truck, the method of operation and advantages will be readily apparent. One or both of the buckets 30 are forced downward by the cylinders 40 and pistons 41 from the position shown at the right in Fig. 4 to the position shown at the left, such downward movement being accompanied by a forward movement of the truck. The bucket is thus forced forward and downward to loading position in the material to be excavated.

The truck is then moved further forward to fill the buckets, with the rearward pressure on the buckets taken by the rollers 59, brackets 57 and bars 56 as previously described.

As soon as the buckets are filled, the truck is stopped and the cylinders 40 are operated reversely to raise the buckets to the position shown at the right in Fig. 4. This raising movement is necessary to clear the forward wheel W when the buckets are swung upward and rearward. The motors M are then operated to swing the buckets along the path indicated at $a$ in Fig. 1 to inverted dumping position above the body B and within the side walls thereof, as indicated in Fig. 3.

If it is desired to dump the load further to the rear in the boy B, the cylinders 40 may be actuated to lengthen the radius of swing of the bucket 30, after the buckets have cleared the front wheels and the housing of the engine E.

All operations are under the convenient control of a single operator seated at S, so that this operator without assistance can do a job of light excavating or grading and can load and remove the excavated material.

By the addition of a comparatively simple excavating and loading attachment, I am thus able to convert an ordinary dump truck into a combined power shovel and truck which will not only haul and dump excavated material, but which will also do the excavating and loading economically and expeditiously.

Having thus described my invention and the advantages thereof, I do not wish to be limited to the details herein disclosed, otherwise than as set forth in the appended claims, but what I claim is:

1. A combined power shovel and truck comprising a truck body, a truck frame, front and rear wheels for said frame, buckets at each side of said frame positioned between the front and rear wheels when in working position and mounted to swing in fixed vertical planes converging rearwardly with respect to the truck body and parts of said buckets when in operative position being positioned beyond the sides of said body, means to raise and lower said buckets in said fixed planes, and means to swing said buckets upward and rearward in said fixed planes to dumping position over said truck body and simultaneously inward between the sides of said body and toward the longitudinal center line thereof.

2. In a combined power shovel and truck, a truck frame, a truck body, an upright supporting frame-work mounted on said frame in front of said body, a motor mounted on said frame-work with the axis of its main shaft substantially horizontal but inclined outside and rearward with respect to the longitudinal vertical central plane of the truck, an extensible arm mounted to swing with said main shaft and about the axis thereof, a bucket mounted on said arm, and means to move said bucket outward and inward with respect to said main shaft, and said motor being effective to swing said arm and bucket to filling and dumping positions of said bucket.

3. A combined power shovel and truck comprising a truck body, a truck frame, buckets mounted at each side of said frame, means to raise and lower said buckets, draw bars attached to the front portion of said truck frame, and brackets on said draw bars providing rearward supports for said buckets when in lowered filling position.

4. A combined power shovel and truck comprising a truck body, a truck frame, buckets mounted at each side of said frame, means to raise and lower said buckets, draw bars attached to the front portion of said truck frame, and brackets on said draw bars providing rearward supports for said buckets when in lowered filling position, and the front edge portion of each bracket being recessed to receive the rear portion of the associated bucket and to prevent sidewise displacement thereof while being filled.

5. A combined power shovel and truck comprising a truck body, a truck frame, buckets mounted at each side of said frame and between the front and rear wheels of said truck and substantially in alignment with said wheels, means to raise the loaded buckets to clear the front wheels, and means to swing said raised buckets in non-parallel planes to dumping position over the truck body, said buckets when in dumping position being substantially nearer to each other than when in filling position.

CHARLES W. SHIPPEE.